United States Patent [19]
Alexander

[11] Patent Number: 5,088,143
[45] Date of Patent: Feb. 18, 1992

[54] DOCK LEVELER LIP ACTUATION MECHANISM

[75] Inventor: James C. Alexander, London, Canada

[73] Assignee: The Serco Corporation, Canada

[21] Appl. No.: 622,068

[22] Filed: Dec. 4, 1990

[51] Int. Cl.⁵ .............................................. E01D 1/00
[52] U.S. Cl. ....................................... 14/69.5; 14/715
[58] Field of Search ...................... 14/69.5, 71.1, 71.3, 14/71.5

[56] References Cited

U.S. PATENT DOCUMENTS

| | | | |
|---|---|---|---|
| 3,137,876 | 6/1964 | Loomis | 14/69.5 |
| 3,639,935 | 2/1972 | Kumpolt | 14/69.5 |
| 3,881,207 | 5/1975 | Jones, Jr. et al. | 14/69.5 |
| 4,127,201 | 11/1978 | Baumann | 14/69.5 X |
| 4,293,969 | 10/1981 | Frommelt | 14/71.1 X |
| 4,555,211 | 11/1985 | Metz | 14/71.1 X |
| 4,619,008 | 10/1986 | Kovach et al. | 14/71.1 X |
| 4,792,274 | 12/1988 | Cockram | 14/71.1 X |
| 4,922,568 | 5/1990 | Hageman | 14/71.3 X |
| 4,961,241 | 10/1990 | Alexander | 14/71.5 X |

Primary Examiner—Ramon S. Britts
Assistant Examiner—Nancy Connolly
Attorney, Agent, or Firm—Sughrue, Mion, Zinn, Macpeak & Seas

[57] ABSTRACT

A dock leveler having an operative lever arm assembly to assist in raising the lip by spring action. The assembly comprises a latch arm which selectively engages a series of spaced stop positions on the underside of the deck to support the lip in an outward postion should it not fully extend during the raising of the deck. A hydraulic shock absorber is adapted to be coupled to the lever assembly at a variety of spaced mounting points on the lever assembly.

13 Claims, 3 Drawing Sheets

DOCK LEVELER LIP ACTUATION MECHANISM

BACKGROUND OF THE INVENTION

This invention relates to a mechanical dock leveler and in particular to an improved actuation and latch mechanism.

Dock levelers or dockboards are adapted to span a gap between a loading dock and the bed of a carrier. These devices include a frame or supporting structure that is mounted in a pit of the dock or on its own frame. The leveler is adapted to be moved from a generally horizontal position, the cross-traffic position, where it lies flush with the upper surface of the dock to a second generally inclined position in which, together with an outwardly extending lip, provides a ramp which bridges the distance between the bed of the carrier and the dock surface.

The art is replete with the number of such structures. They are typically actuated by springs, hydraulics or the like. Typical is a spring loaded dock board illustrated in U.S. Pat. No. 3,137,017. Hydraulically actuated system as illustrated in U.S. Pat. Nos. 4,619,008 and 4,955,923. Representative of other art in the technology relating to techniques of actuation of the dock board and/or the lip are found in U.S. Pat. Nos. 3,299,456; 3,368,229; 3,530,488; 3,835,497; 3,858,264; 3,877,102; 3,995,342; 4,126,909; 4,279,050; 4,328,602; 4,455,703 and 4,922,568. Those patents all illustrate a myriad of techniques for raising and lowering dock boards including the use of safety legs, stops and the like.

A problem on mechanically actuated dock levelers is that the deck weight is supported by springs which propel the deck upward when the hold down device is released. The lip is extended by a linkage, typically a chain attached to the lower frame. The chain tightens as the deck reaches the top of its travel. U.S. Pat. No. 3,137,017 illustrates such a mechanism utilizing a cable coupled with a lever mechanism to raise the lip from its pendant position to an outwardly extending position as the dock board is raised. The lip is usually counter balanced so that it can be easily extended but is held in the extended position by a latch or other mechanism until the leveler is "walked down" to a truck bed. That is, once the deck has been raised to its maximum position, the operator will walk on the leveler to lower it to a proper position where the lip makes contact with the bed of the carrier. The lip is then supported by the truck and the latch falls away.

Due to wear and other environmental considerations when taken with a lack of lubrication or spring fatigue, mechanical dock levelers have a tendency to lose the ability to fully extend the lip. When such occurs, the lip will not latch, that is, be held in an outward position but tends to fall back to the pendent position. This function can be restored by a periodic preventive maintenance and the like and/or adjustment of the springs. But until such occurs the leveler is inoperative. As can be appreciated, these devices operate in a heavy industrial context such as shipping docks or the like.

To overcome this problem some levelers have the mechanical latch replaced by a viscous damper such as an hydraulic shock absorber. This allows free extension of the lip and restricted retraction. If the lip does not fully extend then the shock absorber will still retard the lip long enough for the operator to walk the leveler down to the truck bed.

However, there are two significant draw backs with the use of the shock absorber. First, a mechanical latch will keep the lip extended as long as desired but the shock absorber will begin to retract as soon as the load is applied to it thus forcing the operator to walk the leveler immediately down. Secondly, the viscosity of the hydraulic fluid in the shock absorber is sensitive to changes in temperature. That is, in warm temperatures the lip will fall quickly forcing the operator to walk the leveler down quickly before the lip falls too far to have necessary span for it to rest on the truck bed. Conversely, in cold temperatures the lip will fall very slowly thus forcing the operator to wait unnecessarily a long time for the lip to fall when attempting to remove the leveler from the truck.

The hydraulic shock absorber does however have one advantage which is difficult to achieve in systems that heretofore employed mechanical latches. That is, the hydraulic shock absorber has the ability to retract quickly under high load which may protect the lip mechanism from damage when it is accidently struck by a truck which backs into the lip while still extended.

SUMMARY OF THE INVENTION

Given these problems in prior art dock levelers, it is an object of this invention to provide a mechanical latch which has multiple latch positions to accommodate for variations in functioning of the lip.

It is also an object of this invention to provide a technique by which an hydraulic shock absorber can be used yet still be adjusted to compensate for extreme temperature differences.

Yet another object of the invention is to provide a system in a dock leveler that provides for multiple latch positions to hold the lip in either a fully extended position or an auxiliary position which still allows for useful operation.

These and other objects of this invention are accomplished by employing a dock leveler that has an operating mechanism which provides for a series of auxiliary latch plates. If the lip does not fully extend as the leveler is raised, the lip will be held in an auxiliary latch position holding it sufficiently extended to allow the dock leveler to be used without having to restart the actuation procedure.

Additionally, on the lip extension mechanism, a series of attachment points are used for purposes of varying the effective distance of extension of the hydraulic shock absorber thus allowing it to be repositioned for purposes of temperature compensation.

These and other objects of this invention will be explained in greater detail by referring to the drawing and the description of the preferred embodiments which follow.

DESCRIPTION OF THE PREFERRED EMBODIMENT

Figure 1:
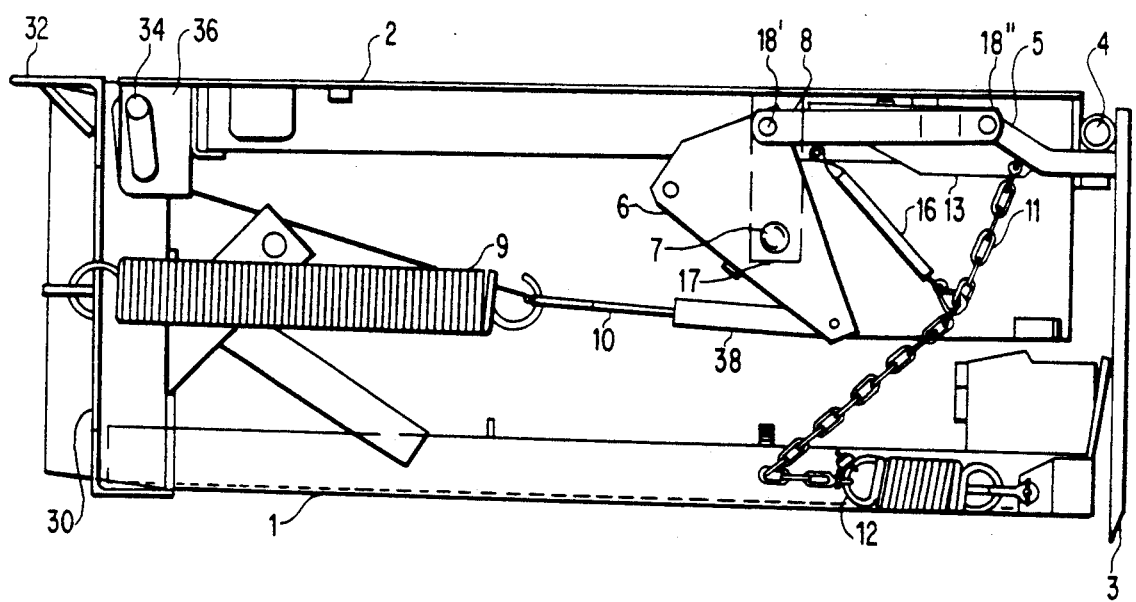
FIG. 1 is a cut away side view illustrating the essential components of this invention with the dock leveler in its stored position.
Figure 2:
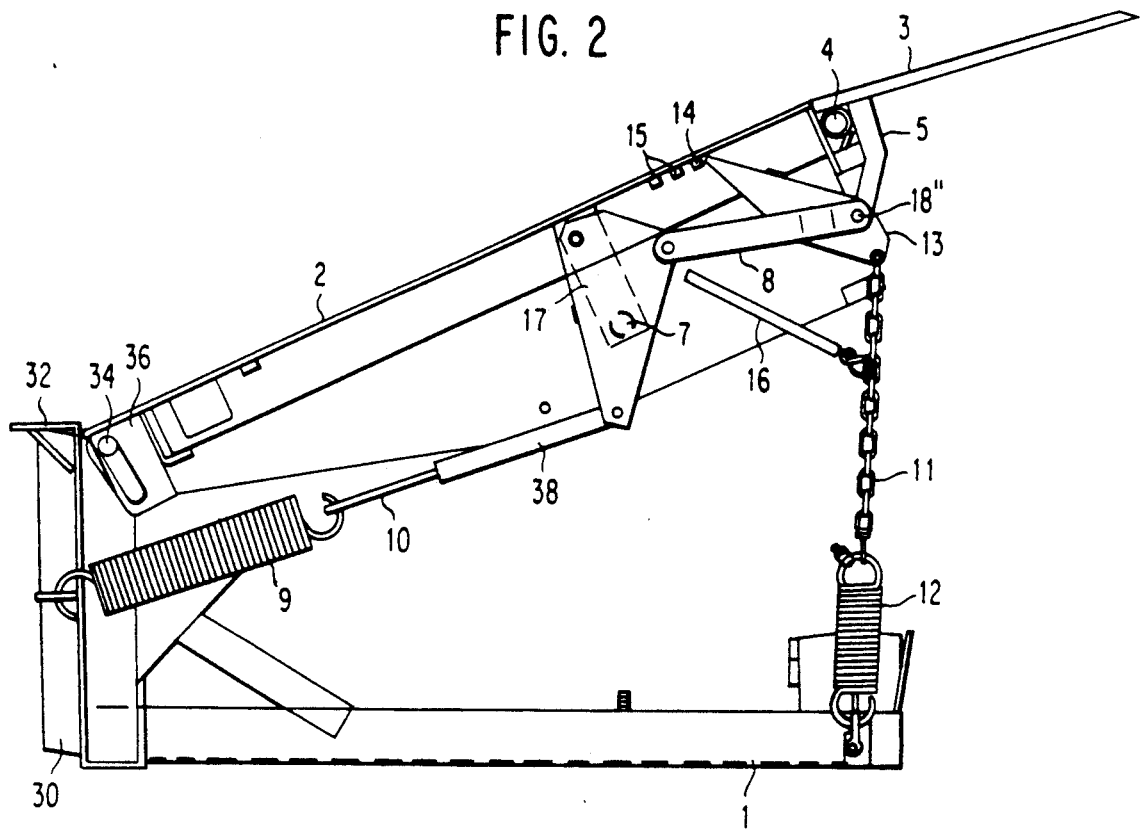
FIG. 2 is a cut away side view illustrating the dock leveler in FIG. 1 with the leveler raised in the lip in the outward position.
Figure 3:
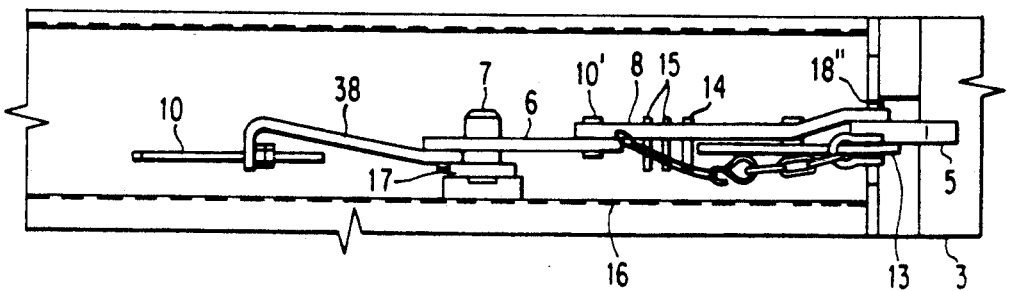
FIG. 3 is a bottom view of the leveler of FIG. 2, partially in section.

Referring now to FIGS. 1–3 the essential components of this invention are depicted. A dock leveler frame 1 is generally pit mounted into the dock surface, not illustrated. The frame 1 comprises a series of horizontally extending base members together with a vertical frame 30 having anchoring flanges 32 to hold the leveler into the dock surface. A dock leveler deck 2 is pivotally mounted on the frame by means of a hinge pin 34 carried by the frame and coupled to the deck 2 by means of a hole in plate 36.

A lip plate 3 is pivotally mounted to the dock leveler deck 2 by means of a lip hinge 4. The lip arm 5 is affixed to the lip plate 3 by welding or the like and is attached to a lever assembly comprising a lever crank member 6 which is rotated about lever assembly pivot pin 7 and is in turn coupled to a link 8 by means of pins 18 and 18.

A lip spring 9 is attached to the frame 30 at one end thereof and by means of an adjustable rod 10 coupled to the lever 6. It will be understood that the rod 10 is adjustable by having it threaded into a nut on arm 38 so that the effective throw of the spring and rod combination can be adjusted to properly counterbalance the weight of the lip 3 when it is fully extended to its operational length as illustrated in FIG. 2. This adjustment feature is illustrated in FIG. 3.

Chain 11 is attached to a latch arm 13 at one end thereof and to a spring 12 at the opposite end, the spring 12 in turn being attached to the frame of the leveler 1. The latch arm 13 is pivotally mounted about pin 18. A primary latch plate 14 is positioned on the underside of the deck 2. A series of auxiliary latch plates 15 are positioned to the rear (inward) of the primary latch plate 14. A spring 16 is attached to the link 8 and to the spring 11.

A bracket 17 mounted to the underside of deck 2 provides the mounting for the leveler assembly pivot pin 7 to allow the lever crank arm 6 to rotate without striking the underside of the deck as illustrated in FIGS. 1 and 2.

In operation, when a leveler hold down (not illustrated) is released, the deck raises upward by springs, not illustrated. When the deck reaches a predetermined height the chain 11 is tightened as illustrated in FIG. 2 and through the latch arm 13 a force is executed on the end of the lip arm 5. This causes rotation about lip hinge 4 and the lip 3 rotates upward that is counterclockwise between the pendant position of FIG. 1 and the extended position of FIG. 2. The purpose of the spring 12 is to limit the force on the chain 11 and to store energy which is released as the lip extends.

The link 8, which is connected to the lip arm 5 and in turn to the lever assembly 6, causes rotation of those elements as the lip 3 extends. That is, the link 8 is connected to the lip arm 5 and to the lever assembly 6 which in turn pivots about pin 7. The lip spring 9 attached to the frame 1 exerts a force on the adjustable rod 10 and the assembly 6 thus causing the lever assembly to rotate clockwise and pushing on the link 8 and assist the lip 3 thereby raising the lip.

The chain 11 pulls on the latch arm 13 which pivots about pin 18. When the lip 3 is raised, the latch arm 13 engages the primary latch plate 14. This is illustrated in FIG. 2. If however the lip does not fully extend the latch arm 13 will engage one of the auxiliary plates 15. This occurs because as the lip 3 if not latched up then tends to rotate in a clockwise direction, and in turn drives the lip arm 5 inward which in turn forces the latch arm 13 to move inward and engage one auxiliary latch plate.

The spring 16 is attached to the chain 11 and to the link 8. The purpose of spring 16 is to maintain tension on the chain connected to the latch arm 13 even if tension on the lower part of the chain tends to partially relax. This in turn will insure the engagement of the latch arm even if the lip 3 does not travel all the way to its fully extended position.

Figure 4:
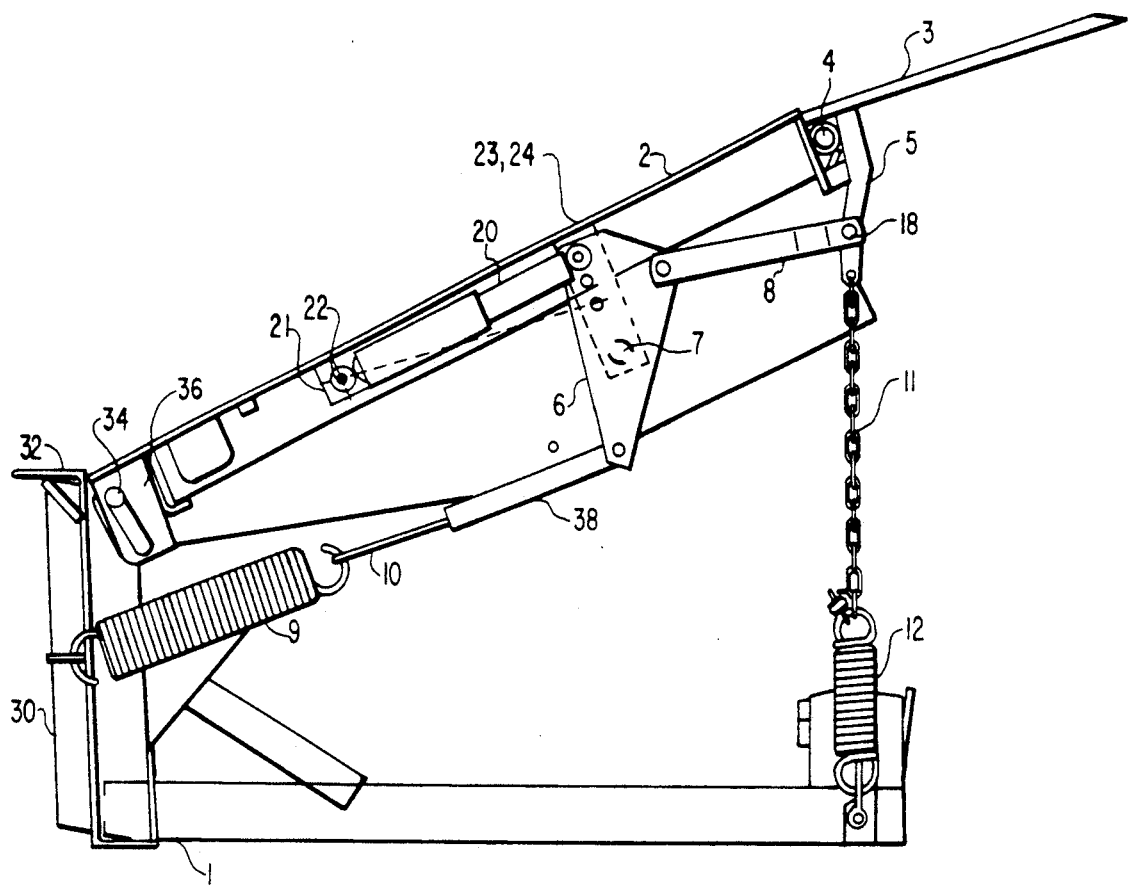
FIG. 4 is a cut away side view of a leveler with the lip fully extended illustrating the various stops for the shock absorber for purposes of temperature compensation.
Figure 5:
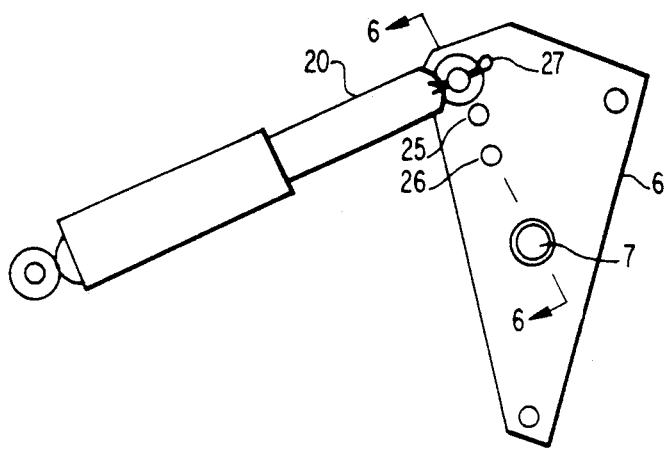
FIG. 5 is a schematic side view illustrating in greater detail the positions for the shock absorber.
Figure 6:
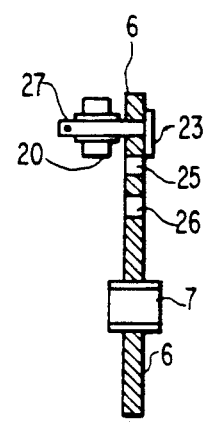
FIG. 6 is a section along lines 6—6 of FIG. 5.

Referring now to FIGS. 4, 5 and 6 a second aspect of this invention will be described. FIG. 4 is a second preferred embodiment of the invention which includes a hydraulic shock absorber 20 which is connected to the deck 2 by means of a bracket 21 and a pin 22 mounted on the bracket. A pin 23 attaches the opposite end of the shock absorber to the lever assembly 6.

FIG. 4 illustrates the dock leveler with the shock absorber 20 retarding the lip from falling by having extension thereof relative to the lever assembly 6.

Referring now to FIGS. 5 and 6 in accordance with this invention the lever crank arm 6 is modified to provide selective mountings for the shock absorber. FIG. 6 is a section through lines 6-6 to illustrate the shock absorber attached to the deck assembly by means of pin 23 and spring clip or pin 27 locking the assembly in position. Pin 23 may be clevis pin.

As illustrated in FIG. 4, the hydraulic shock absorber 20 is attached to the deck assembly by means of pin 22 attached to bracket 21. In turn, the opposite end is attached to the lever assembly 6 by means of pin 23 which passes through the end of the shock absorber and through a first hole 24 and the lever assembly 6. When the lip 3 is raised, the resisting force of the hydraulic shock absorber is exerted on the lever crank arm 6 and through link 8 and lip arm 5 to prevent the lip from falling rapidly. If the lip falls too slowly in colder temperatures however the shock absorber can be relocated to other holes 25 or 26. These are illustrated in FIGS. 5 and 6. This reduces the distance from rotational pin 7 to the hydraulic shock absorber and thus reduces the resisting moment or the mechanical advantage of the lever assembly 6 on the shock absorber 20. That is, by repositioning the shock absorber to a point closer to the pivot pin 7, the moment arm is progressively decreased.

The hydraulic shock absorber can easily be repositioned by removing the retaining pin or clip 27 and moving the clevis pin 23 to a new hole. The shock absorber is then reinstalled very quickly without the need of tools or significant disassembly of the system.

It is apparent that modifications of this invention can be practiced without departing from the essential scope thereof.

I claim:

1. A dock lever comprising:
   a frame, a deck pivotably mounted to said frame, a lip pivotably mounted to one end of said deck, stop means on an underside of said deck;
   a lip arm attached to said lip, a lever assembly pivotably mounted on said deck and coupled to said lip arm, resilient means coupled to said lever arm assembly to extend said lip as said deck raises;
   a latch arm coupled to said lever assembly an engageable with said stop means to hold said lip in an outward extended position; and a chain attached at one end to said frame and at another end to said latch arm, whereby as deck pivots on said frame to raise, said chain tensions to extend said lip by rotation relative to said deck and to rotate said latch arm into engagement with said stop means.

2. The dock leveler of claim 1 further comprising: spring means to tension said chain as said deck raises.

3. The dock leveler of claim 1 wherein said stop means comprise a series of spaced latch plates fixed to said deck, said latch arm, said lip arm and said lever assembly rotatable relative to each other on a common pin.

4. The dock leveler of claim 1 wherein said lever assembly comprises a lever crank mounted for rotation on said deck said resilient means coupled to said lever crank, and a pink coupling said lever crank to said lip arm.

5. The dock leveler of claim 1 further comprising. a hydraulic shock absorber mounted to said deck and said lever assembly to retract said lip.

6. The dock leveler of claim 5 further comprising a plurality of mounting positions on said lever assembly for one end of said hydraulic shock absorber.

7. A dock leveler comprising;
a frame, a deck pivotably mounted to said frame, a lip pivotably mounted to one end of said deck,
a lever assembly pivotably mounted on said deck and coupled to said lip:
a hydraulic shock absorber mounted to said deck and said lever assembly and, a series of mounting positions on said lever assembly to position one end of shock absorber at different spaced locations relative to a pivot point for said lever assembly.

8. The dock leveler of claim 7 further comprising:
a lip arm attaching to said lip, said lever assembly connected to said lip arm, a chain attached at one end to said frame and at another end to said lip arm, whereby as said deck pivots on said frame to raise, said chain tensions to extend said lip by rotation relative to said deck.

9. The dock leveler of claim 7 further comprising, resilient means connected between said lever assembly and said frame to elevate said lip as said deck is raised.

10. The dock leveler of claim 9 wherein said resilient means comprises a spring in series with an adjustable rod.

11. The dock leveler of claim 7 wherein said lever assembly comprise a crank arm mounted for rotation on an underside of said deck. a link pivotably mounted to said crank arm and coupling said crank arm to said lip.

12. The dock leveler of claim 11 wherein said series of mounting positions are located on said crank arm.

13. The dock lever of claim 11 further comprising a bracket to mount said crank arm at a spaced location from said deck.

* * * * *